US006006475A

United States Patent [19]

Schwantes et al.

[11] Patent Number: 6,006,475

[45] Date of Patent: Dec. 28, 1999

[54] SPRING LOADED SWINGING DOOR SYSTEM

[75] Inventors: James E. Schwantes, New Berlin; James R. Scott, Greendale; Michael L. Slosiarek, Greenfield; Donald G. Mussa, Big Bend; James A. Treichel, Waukesha, all of Wis.

[73] Assignee: Nabco Entrances Inc., Muskego, Wis.

[21] Appl. No.: 09/035,633

[22] Filed: Mar. 4, 1998

[51] Int. Cl.[6] ................................ E05F 11/24; F03G 1/08

[52] U.S. Cl. .................................. 49/341; 16/49; 49/139; 49/140; 49/340; 49/345; 49/382; 185/40 R; 185/45; 267/156; 411/195; 411/197

[58] Field of Search ............................. 49/139, 140, 340, 49/341, 345, 382; 185/40 R, 45; 267/156, 272; 16/49; 411/195, 196, 197

[56] References Cited

U.S. PATENT DOCUMENTS

| | | | |
|---|---|---|---|
| 1,614,789 | 1/1927 | Green . | |
| 2,108,328 | 2/1938 | Carnahan | 268/19 |
| 2,599,744 | 6/1952 | Brundage | 268/108 |
| 2,806,244 | 9/1957 | Bernhard | 185/45 X |
| 3,247,617 | 4/1966 | Catlett | 49/107 |
| 3,422,704 | 1/1969 | Catlett | 74/801 |
| 3,484,991 | 12/1969 | Check | 49/137 |
| 4,045,914 | 9/1977 | Catlett | 49/334 |
| 4,220,051 | 9/1980 | Catlett | 74/89.15 |
| 4,333,270 | 6/1982 | Catlett | 49/336 |
| 4,501,090 | 2/1985 | Yoshida et al. | 49/264 |
| 4,881,621 | 11/1989 | Ishida | 185/45 X |
| 4,973,894 | 11/1990 | Johansson | 318/280 |
| 5,036,620 | 8/1991 | Beran et al. | 49/141 |
| 5,221,239 | 6/1993 | Catlett | 475/342 |
| 5,243,735 | 9/1993 | O'Brien, II | 16/64 |

*Primary Examiner*—Allan D. Herrmann
*Attorney, Agent, or Firm*—Quarles & Brady, LLP

[57] ABSTRACT

An spring apparatus for use with an automatic swinging door closure system wherein the system includes a motor linked to a door via a gear train and a drive arm, the train including a plurality of gears including a first gear adjacent the motor, the motor driving the gears to move the door in either a clockwise or counter-clockwise direction and the apparatus for driving the gears in the direction opposite motor direction when motor power is cut off, the apparatus including a spring mounted within a housing which is linkable to the first gear in a first orientation to cause clockwise door movement and is linkable to the first gear in a second orientation to cause counter-clockwise door movement, the apparatus is easily modifiable so as to be configured in either of the first or second orientations and also includes a tension adjusting mechanism for adjusting spring tension.

28 Claims, 6 Drawing Sheets

SPRING LOADED SWINGING DOOR SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to door operating devices and more particularly to a motorized swinging door apparatus having a spring loaded door closing mechanism.

There are many closure applications wherein a pedestrian door is opened often to facilitate passage therethrough yet should remain closed most of the time. To this end the door industry has configured many different types of automatic opening/closing systems. One exemplary system for opening and closing a swinging door is described in U.S. Pat. No. 4,333,270 which is incorporated herein by reference. That system includes an activation mechanism, a motor, a gear box, a shaft, an arm and a helical spring. The gear box typically comprises three or four gears arranged to form a gear train. The gears include first and last gears at proximal and distal ends of the gear train, respectively. The last gear is typically a piston type gear such that when other gears are rotated, the piston gear is driven linearly. The shaft includes gear teeth at least a proximal end and the piston gear includes linear teeth for engaging the shaft teeth, the shaft rotating when the piston gear is driven linearly.

The motor is linked to the first gear at the proximal end of the gear train such that when a motor rotor rotates, the gears cause the piston gear at the distal end of the gear train to move linearly thereby rotating the shaft. The gears are designed so that motor force increases along the gear chain. The arm is linked at one end to the shaft and at another end to the door and can be forced between open (i.e. wherein the door is open) and closed (i.e. wherein the door is closed) positions. The spring is linked to the last gear and biases the last gear, shaft and arm into the closed position. Typically the spring operates over only a small operating range (e.g. less than 4 inches). The activation mechanism, typically a foot pad, microwave or infra-red sensor, is linked to the motor.

When a pedestrian is sensed by the activation mechanism (e.g. the pedestrian steps on the foot pad or enters the space monitored by the sensor), the motor is excited. When the motor is excited, the motor forces the gears to rotate, the piston gear forcing the arm and door into the open position against the spring force. When the door is opened, the spring is compressed and mechanically loaded. When the motor is turned off or is driven in the opposite direction, the spring decompresses and forces the door closed. If, during a period when the door is closing, a pedestrian again activates the activation mechanism, the motor is again excited and the door is forced open against the spring force.

According to another design, instead of using a helical spring which operates on a last piston-type gear adjacent the shaft, a torsion spring (i.e. similar to a watch spring) has been used in conjunction with a last round gear to effect door closure. In this case, the shaft extends axially from the last round gear and the spring forces rotation of the gear and associated shaft in a closing direction when power is removed from an associated motor. When the motor is turned on the motor compresses the spring as the last gear and shaft cooperate with an arm to open the door. In this case, the torsional spring typically only rotates through approximately 135 degrees between opened and closed spring positions. An example of this type of apparatus is described in U.S. Pat. No. 4,045,914 which is incorporated herein by reference.

For safety purposes, spring and gear systems like those described above are rendered inaccessible to pedestrians by providing a housing around the entire system which is only removed during installation or maintenance.

While most automatic swinging door systems have components and operate as described above, most system manufacturers provide several different system configurations having the general characteristics described above to facilitate door operation, each configuration designed to accommodate a unique set of environmental constraints. For example, the system configuration required to cause a door to open inwardly is different than the configuration required to cause a door to open outwardly. In addition, the system configuration required to open a door inwardly which is hinged along a right hand door edge is different than the configuration required to open a door inwardly which is hinged along a left hand edge.

While each of the systems above operate to open and close a door, each system suffers from several shortcomings. First, because the spring is linked to the last gear in the gear train, the spring has to be chosen such that it can overcome the full weight of the door in addition to gear friction to effect closure. In addition, in certain applications it is necessary to provide a spring capable of even more force than that required to overcome door weight and gear friction to close a door. For example, where an outside door opens inwardly and is located in an area prone to relatively high wind, the spring also has to overcome the wind force on the door to close the door. Similarly, in climates where snow can be expected the spring force may have to overcome some snow blockage at the base of the door during closure. Where environmental factors can be expected to periodically hinder door closure, springs which store extra force are provided.

In these configurations, while the spring will cause a door which is impeded to a maximum degree to close at an ideal rate, when the door is unimpeded or is impeded at less than the maximum degree and the motor is turned off the spring will distress rapidly closing the door at a faster than ideal rate. Rapid closure can cause door damage and/or can injure a pedestrian within the range of door motion.

For this reason, to provide an ideal spring distressing rate and hence door closure rate which is independent of environmental conditions, the motor is often used to control spring distressing which in turn regulates door closure speed. To this end, assuming clockwise motor rotation opens a door, the motor is driven in a counter-clockwise direction during closure and at a rate which is slower than the rate at which the spring alone would close the door. This type of motor control is often referred to as braking as it effectively brakes the rate of door closure.

Despite large spring force requirements, the space provided for the system spring is extremely limited for both practical and aesthetic reasons. As indicated above, typical helical springs are only approximately twelve inches in length. Torsional springs are typically less than four inches in diameter. Such springs are relatively expensive and usually, to meet the force and space criteria, have to be designed close to their material failure limits. Springs designed close to their material failure limits are more likely than more robust springs to fail which increases component and maintenance costs over the useful life of the system.

Second, none of the systems described above is easily reconfigurable to accommodate different environmental constraints. Where a system is used with a right-hand-hinged inwardly opening door, the system cannot easily be reconfigured for use with a left-hand-hinged inwardly opening door or either a right-hand-hinged or left-hand-hinged outwardly opening door. This is particularly problematic where environmental constraints are changed and different door opening characteristics are required.

In addition, these systems cannot be reconfigured such that the spring opens the door and the motor closes the door. While most applications favor a door which is driven open by the motor and is forced closed by the spring, there are applications where the opposite is advantageous where the motor closes the door and the spring opens the door. An example might be an interior office with an inwardly opening door where there are no windows to provide natural light. Upon power loss which may occur during an emergency, the above systems close the door leaving an office occupant in the dark and forcing the occupant, after locating the door, to pull the door open against the spring force to exit.

Moreover, the springs in these systems cannot be easily replaced for maintenance purposes or to change the spring force to accommodate different environmental constraints. For example, as indicated above, some doors may be located in a relatively windy environment while other similarly configured doors are not. While a high stress spring may be required for door closure in the windy environment, the high stress spring may not be required in another environment. In this case, it would be advantageous to have a configuration which allows an installer to select and easily install the spring required for the system thereby minimizing system costs. In fact, it would be advantageous to have a system wherein, if desired, the spring could easily be removed from the configuration and the motor alone could be used to open and close the door.

Therefore, it would be advantageous to have an automatic swinging door system which requires a relatively inexpensive spring which is both relatively small, is well within material limit constraints and which can still provide a large force for closing a door, wherein the system is easily configurable to accommodate many different environmental constraints.

BRIEF SUMMARY OF THE INVENTION

It has been recognized that many of the problems with prior art spring biasing door mechanisms can be solved by rearranging door closure system components. Specifically, instead of providing a spring biasing mechanism which operates directly on the last gear (i.e. removed from the motor) in a gear train, according to the present invention a biasing mechanism is provided which operates on the first gear (adjacent the motor).

Where the biasing mechanism is provided adjacent the motor, spring force is increased along the gear train and a relatively smaller spring can be used to move a door. Thus, one object of the invention is to minimize spring force required to close a door. A related object is to minimize spring size. Because required force is minimized generally a smaller spring can be employed in the door closure system. One other related object is to decrease spring and overall system cost. Smaller springs are generally less expensive and, because less spring power is required, the spring need not be designed near its operational limits to achieve required door moving force.

Another object is to minimize the likelihood of pedestrian injury caused by an inoperable automatic door. By providing the spring force on the first gear adjacent the motor, the spring force is decoupled from the door if any gear in the train fails. In this case, if a gear fails the spring will not close or bias the door toward the closed position. Therefore, upon gear failure the door swings freely on its hinges and the likelihood of a pedestrian passing through the doorway being injured is minimized.

Yet another object is to provide a closure system which can be configured into many different configurations to accommodate different doorway requirements (e.g. left-hand-hinged outward opening, left-hand-hinged inward opening, right-hand-hinged outward opening and right-hand-hinged inward opening. To this end, the inventive spring apparatus includes a torsional spring mounted inside a spring housing which can be linked to the first gear in either one of two different orientations. A first orientation causes spring force tending to rotate the first gear in a first direction and a second orientation causes spring force tending to rotate the first gear in a second direction opposite the first. By choosing between the first and second spring orientations any door configuration can be accommodated.

One other object of the invention is to enable easy spring apparatus reconfiguration. To this end, the spring housing is located outside a gear housing for easy access and is secured to the spring housing via a simple securing mechanism. In particular, when the system is assembled, the spring housing is attached to a bottom surface of the gear housing via a plurality of screws. To change spring apparatus orientation, the apparatus is simply detached from the system, flipped over and reattached via the screws.

One other object of the invention is to provide a spring assembly wherein spring force or tension is adjustable. A post is provided which links one end of the spring to the first gear, one end of the post linked to the gear. An opposite end of the post is accessible through an aperture in the spring housing. During pretensioning and with the drive arm disattached from the door the gears are forced to rotate such that the first gear and linked post rotate and increase spring tension. For example, the drive arm can be used to crank the gears against the spring force thereby increasing spring tension. Next the post is locked in its pretensioned state and the drive arm is attached between the door and an output drive shaft in its operable configuration. Then the post is unlocked. The door and gears cooperate to maintain spring tension.

This pretensioning process is extremely simple and can easily be accomplished by a single person. In addition, because spring tension can easily be modified, the pretensioning features makes the inventive configuration even more universally useful as different spring tensions might be required in different applications or, indeed, even during the useful life of a single system different spring tensions might be advantageous or even required. For example, as spring characteristics change during use, tension might need to be adjusted. In addition, a single system might be installed in several different applications over its useful life and each application may require different spring tension (e.g. different applications might be in disparate climates).

Specifically, the invention includes a spring apparatus for use with a swinging door closure system, the system used to move the door between first and second door positions, the system including a motor having a rotor shaft, a gear housing and a plurality of gears forming a gear train positioned within the housing, the train having a first gear at a proximal end in operative communication with the rotor shaft and a last gear at a distal end opposite the proximal end. The first gear is centered along a gear axis for rotation and a drive shaft extending from the last gear. An arm member is linked to the drive shaft at a proximal end and to the door at a distal end. The apparatus is positionable in at least a first orientation with respect to the closure system. When power is provided to the motor to drive the rotor in a first direction the gears rotate such that the drive shaft and arm force the door from the first to the second position. When the apparatus is in the first orientation, the apparatus is for forcing the door from the second back into the first position when power is cut off to the motor. The apparatus includes a stopper securable in a fixed position with respect to the gear housing and a torsional spring arranged about the gear axis having central and lateral spring ends, a first of the spring ends linked to the first gear and a second of the spring ends linked to the stopper. When the apparatus is in the first orientation the spring is wound about the gear axis from the first to the second ends such that the spring is compressed when power is provided to the motor to drive the rotor in the first direction and the spring expands thereby forcing the door back into the first position when power is cut off from the motor.

In one preferred embodiment the apparatus includes a spring housing having a lateral member forming an internal wall which forms a chamber, the lateral member having first and second edges at first and second oppositely facing ends of the chamber, respectively. The internal wall also forms the stopper. The housing also includes a housing cover which essentially encloses the chamber first end, the first gear including a securer and the apparatus further including a linking post having first and second ends, the first end formed so as to be securable to the securer. The post extends from the first end along the gear axis approximately through the center of the spring to the post second end, the spring contained within the chamber with the central end secured to the post and the lateral end secured to the stopper. The apparatus also includes a securing mechanism for securing the spring housing to the gear housing, when the apparatus is in the first orientation, the first post end securely linked to the securer and the second edge proximate the gear housing. This configuration allows easy access to the spring apparatus and also encloses the apparatus to discourage access by installers.

In one embodiment the post forms a lateral surface between its first and second ends and the lateral surface forms a slot for securely receiving the spring central end. In one aspect the post first end is keyed and the securer forms an oppositely keyed recess for receiving the first end when the apparatus is in the first orientation.

Also the apparatus may further include a tension adjuster for adjusting the tension of the spring. The housing cover forms a cover aperture which is essentially concentric with the gear axis, the second post end extends through the aperture and, when the apparatus is in the first orientation, spring tension can be adjusted by rotating the post about the gear axis. Also the apparatus may include a locking mechanism for locking the post in an adjusted position.

In another aspect the second post end is also keyed and the tension adjuster includes an adjusting bolt which forms an oppositely keyed recess which securely receives the second post end when the apparatus is in the first orientation, spring tension being adjustable by rotating the adjusting bolt.

In yet another aspect the adjusting bolt forms a bolt lateral surface and the apparatus further includes a locking mechanism for locking the adjusting bolt into an adjusted position during pre-tensioning of the spring. The locking mechanism includes a locking plate which is linked to the housing cover for movement between an unlocked position wherein the plate does not contact the bolt lateral surface and a locked position wherein the plate engages at least a portion of the bolt lateral surface and impedes rotation thereof.

In one other aspect the housing cover is a first housing cover, the housing aperture is a first housing aperture, the assembly further includes a second housing cover which essentially encloses the chamber second end and the second housing cover forms a second cover aperture through which the post first end extends. This aspect provides a spring assembly which is essentially entirely enclosed within a sealed spring housing and is therefore extremely easy to manipulate during installation, maintenance and, if necessary, reconfiguration. The housing also renders the spring assembly relatively safe during installation and assembly as the spring is enclosed in the housing at all times and specifically during a pre-tensioning procedure.

In another aspect the first and second post ends are identically keyed and the first and second housing covers are identical. When power is provided to the motor to drive the rotor in a second direction opposite the first direction the gears rotate such that the drive shaft and arm force the door from the second to the first position. The apparatus is also positionable in a second orientation for forcing the door from the second back into the first position when power is cut off to the motor. When in the second orientation the spring housing is secured to the gear housing such that the first housing cover is adjacent the gear housing, the second keyed end is securely received by the securer and the spring is wound about the gear axis from the first to the second ends such that the spring is compressed when power is provided to the motor to drive the rotor in the second direction and the spring expands thereby forcing the door back into the second position when power is cut off from the motor.

The apparatus may also include a tension adjuster for adjusting spring tension, the adjuster including an adjusting bolt which forms a recess which is keyed to securely receive either of the first or second keyed post ends, the adjusting bolt receiving the second post end when the apparatus is in the first orientation and receiving the first post end when the apparatus is in the second orientation.

The invention also includes a swinging door closure system for moving a door between first and second door positions, the system including a motor having a rotor shaft, a gear assembly including a gear housing and a plurality of gears forming a gear train positioned within the housing, the train having a first gear at a proximal end in operative communication with the rotor shaft and a last gear at a distal end opposite the proximal end, the first gear centered along a gear axis for rotation, a drive shaft extending from the last gear, an arm member linked to the drive shaft at a proximal end and linkable to the door at a distal end and a spring assembly. The spring assembly includes a stopper securable in a fixed position with respect to the gear housing and a torsional spring arranged about the gear axis having central and lateral spring ends, a first of the spring ends linked to the first gear and a second of the spring ends linked to the stopper. When power is provided to the motor to drive the rotor in a first direction the gears rotate such that the drive shaft and arm force the door from the first to the second position. The spring assembly can be positioned in a first orientation wherein the spring is wound about the gear axis from the first to the second ends such that the spring is compressed when power is provided to the motor to drive the rotor in the first direction and the spring expands thereby forcing the door back into the first position when power is cut off from the motor.

Here the spring assembly further includes a spring housing including a lateral member forming an internal wall which forms a chamber, the lateral member having first and second edges at first and second oppositely facing ends of the chamber, respectively, each of the second housing cover forming a first cover aperture and the first housing cover forming a second cover aperture, the internal wall also forming the stopper. The housing also includes first and second housing covers which essentially encloses the cylindrical channel first and second ends, respectively. The first gear includes a securer and the apparatus further includes a linking post having first and second ends, each of the first and second ends formed so as to be securable to the securer. The post extends from the first end through the first cover aperture, chamber and second cover aperture to the post second end. The spring is contained within the chamber with the central end secured to the post and the lateral end secured to the stopper. The system also includes a securing mechanism for securing the spring housing to the gear housing. When the apparatus is in the first orientation the first post end is securely linked to the securer and the second cover is adjacent the gear housing.

When power is provided to the motor to drive the rotor in a second direction opposite the first direction the gears rotate such that the drive shaft and arm force the door from the second to the first position. In this case the spring assembly is also positionable in a second orientation for forcing the door from the second back into the first position when power is cut off to the motor. When in the second orientation the spring housing is secured to the gear housing such that the first housing cover is adjacent the gear housing, the second keyed end is securely received by the securer and the spring is wound about the gear axis from the first to the second ends such that the spring is compressed when power is provided to the motor to drive the rotor in the second direction. The spring expands thereby forcing the door back into the second position when power is cut off from the motor.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Hardware

Figure 1:
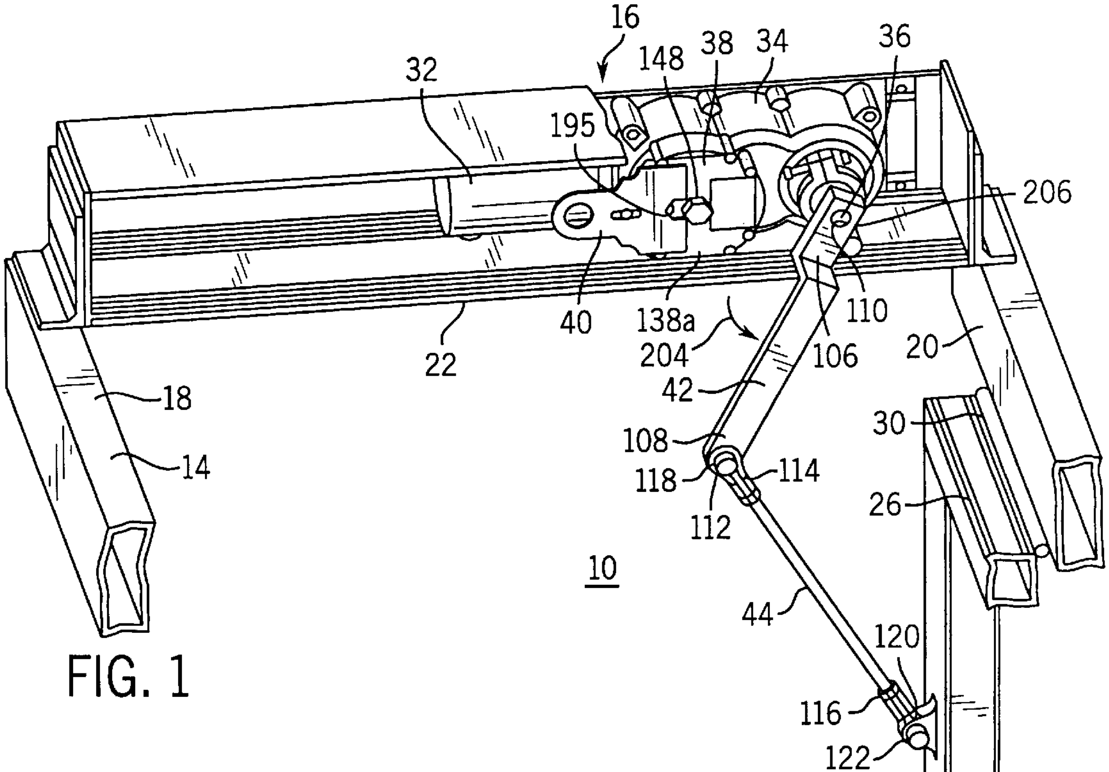
FIG. 1 is a partially cut away perspective view of an automatic swinging door closure system according to the present invention configured so that a spring assembly causes closure of a right-hand-hinged outwardly opening door.
Figure 1:
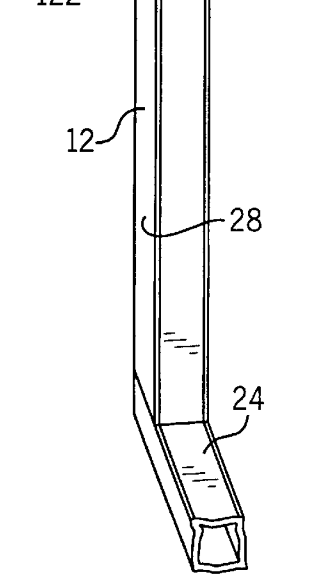

Referring now to the drawings, wherein like reference characters represent corresponding elements throughout the several views, and more specifically referring to FIG. 1, the inventive door closure system will be described in the context of a conventional door and doorway assembly referred to generally by 10. Assembly 10 includes a door 12 (shown in partial view), a doorjamb or frame 14 (also shown in partial view) and an automatic door operating system generally referred to by numeral 16. Frame 14 includes first and second lateral members 18, 20 respectively and a header member 22 disposed at the top of lateral members 18 and 20 and traversing the distance therebetween. As illustrated, door 12 also includes first and second lateral members 24 and 26 and a header member 28 which traverses the distance therebetween. Although not illustrated, in the embodiment shown, door 12 may also include a glass panel or the like framed between members 24, 26 and 28 and, perhaps, a base member similar to header member 28. A plurality of hinges (only one shown) connect lateral member 26 to lateral member 20 and facilitate rotation of door 12 about hinges 30 for, generally, moving door 12 between an open (illustrated) and a closed position, door 12 generally positioned within the space defined by frame 14 when the door is in the closed position.

Unless indicated otherwise, for the purposes of this explanation it will be assumed that door 12 is right-hand-hinged and opens outwardly by, as looking upwardly, swinging counter-clockwise about hinges 30. Other configurations will be described and identified specifically below. Also, each time door or other component rotation is referred to, it will be from a bottom reference point looking up unless specifically indicated otherwise.

Figure 2:
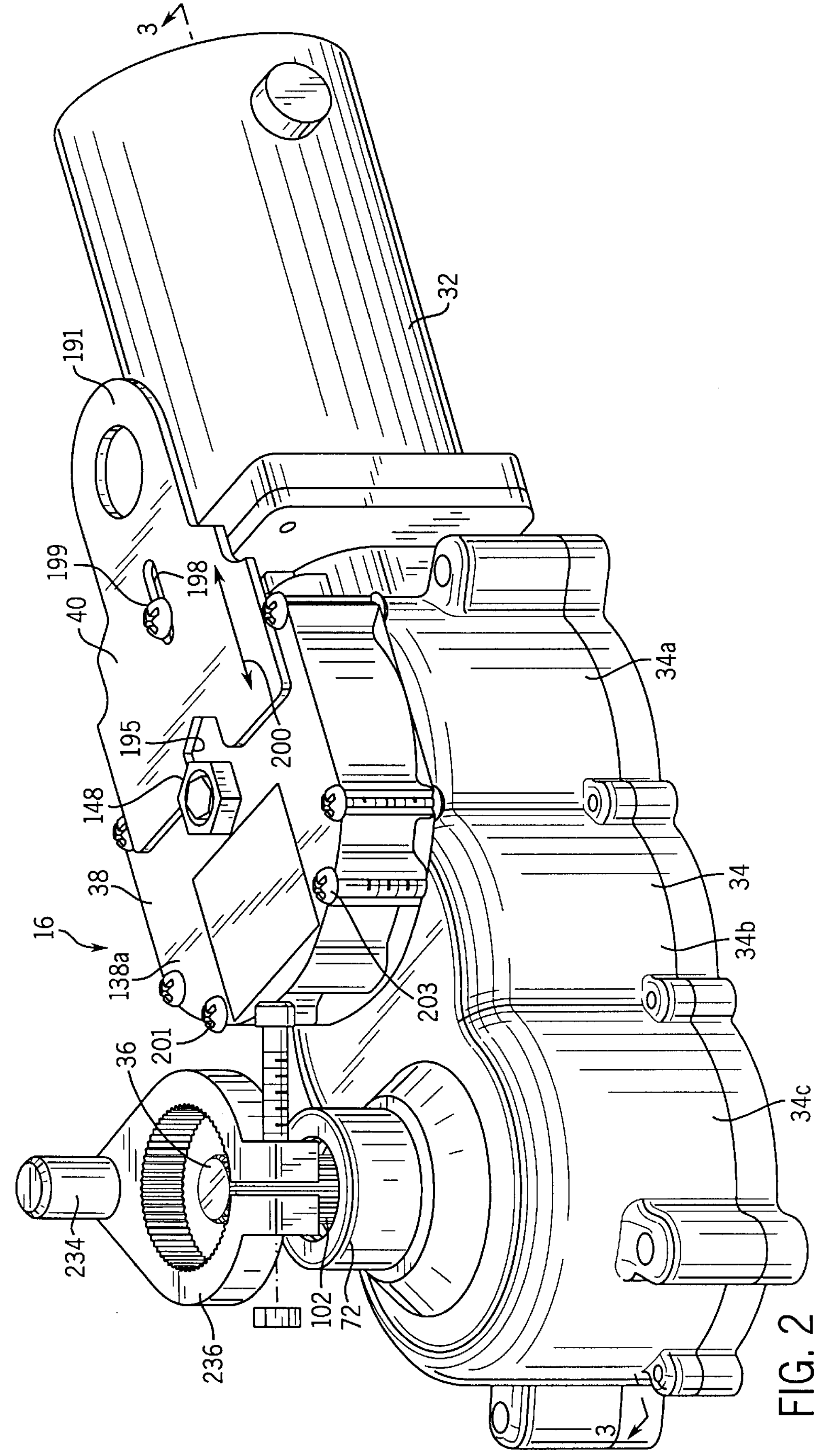
FIG. 2 is a perspective view of the automatic door system of FIG. 1.

Referring now to FIGS. 1 and 2, operating system 16 generally includes a motor 32, a gear train mounted within a gear housing 34, a drive shaft 36 which extends from housing 34, a spring assembly 38, a locking mechanism 40, a drive arm 42 and an extension arm 44.

Figure 3:
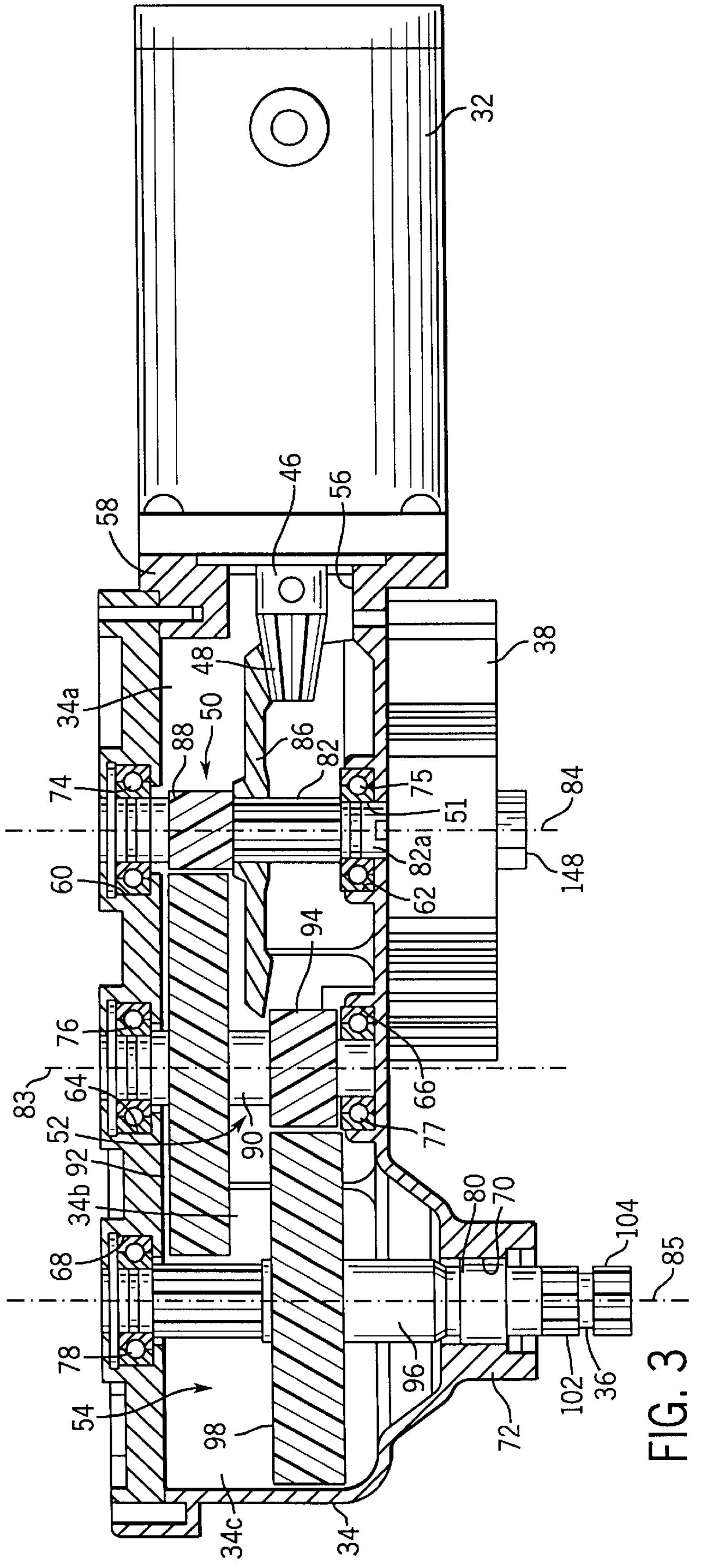
FIG. 3 is a partial cross-sectional view taken along the line 3—3 of FIG. 2.

Referring also to FIG. 3, motor 32 is a conventional type motor driven by electrical power provided by a motor controller (not illustrated). Motor 32 includes an output shaft 46 which is connected to a motor rotor (not shown). Motor 32 can be excited by providing power thereto to drive the rotor and shaft 46 in either a clockwise or counter clockwise direction. To simplify this explanation it will be assumed motor 32 only drives shaft 46 in a single counter-clockwise direction but that when motor power is cut off shaft 46 can be forced in the clockwise direction. The end of shaft 46 includes a toothed frusto-conical spiral bevel gear 48.

The motor controller is connected to some type of activation mechanism (not illustrated) for sensing when a pedestrian is in the proximity of door 12 at which point the door is opened via system 16. For example, the activation mechanism may be a foot pad, a proximity sensor, a heat sensor or some other suitable mechanism known in the art. When a pedestrian is sensed, the controller provides power to motor 32 which cooperates with the other components in system 16 to open door 12 as will be described in more detail below.

Referring still to FIGS. 1, 2 and 3, gear housing 34 generally forms overlapping first, second and third gear chambers 34*a*, 34*b* and 34*c* wherein chamber 34*a* overlaps chamber 34*b* and chamber 34*c* also overlaps chamber 34*b*. Each of chambers 34*a*, 34*b* and 34*c* is generally conically shaped being formed about gear axis 84, 83 and 85, respectively. Housing 34 also forms a plurality of openings including a shaft opening 56 at a proximal end 58, a plurality of shaft mounting openings including an opening 60 in chambers 34*a* which is concentric with axis 84, an opening 64 in chamber 34*b* which is concentric with axis 83 and an opening 68 in chamber 34*c* which is concentric with axis 85. Housing 34 also forms a spring linking opening 51 which is concentric with axis 84 and is formed opposite opening 60 and forms a drive shaft opening 70 concentric with axis 85 and opposite opening 68. Housing 34 also forms a bearing retainer bore 66 which is concentric with axis 83 and opposite opening 64. Housing 34 further forms an extended and reinforced nipple section 72 which extends from third chamber 34*c* and forms drive shaft opening 70 opposite opening 68.

Figure 6:
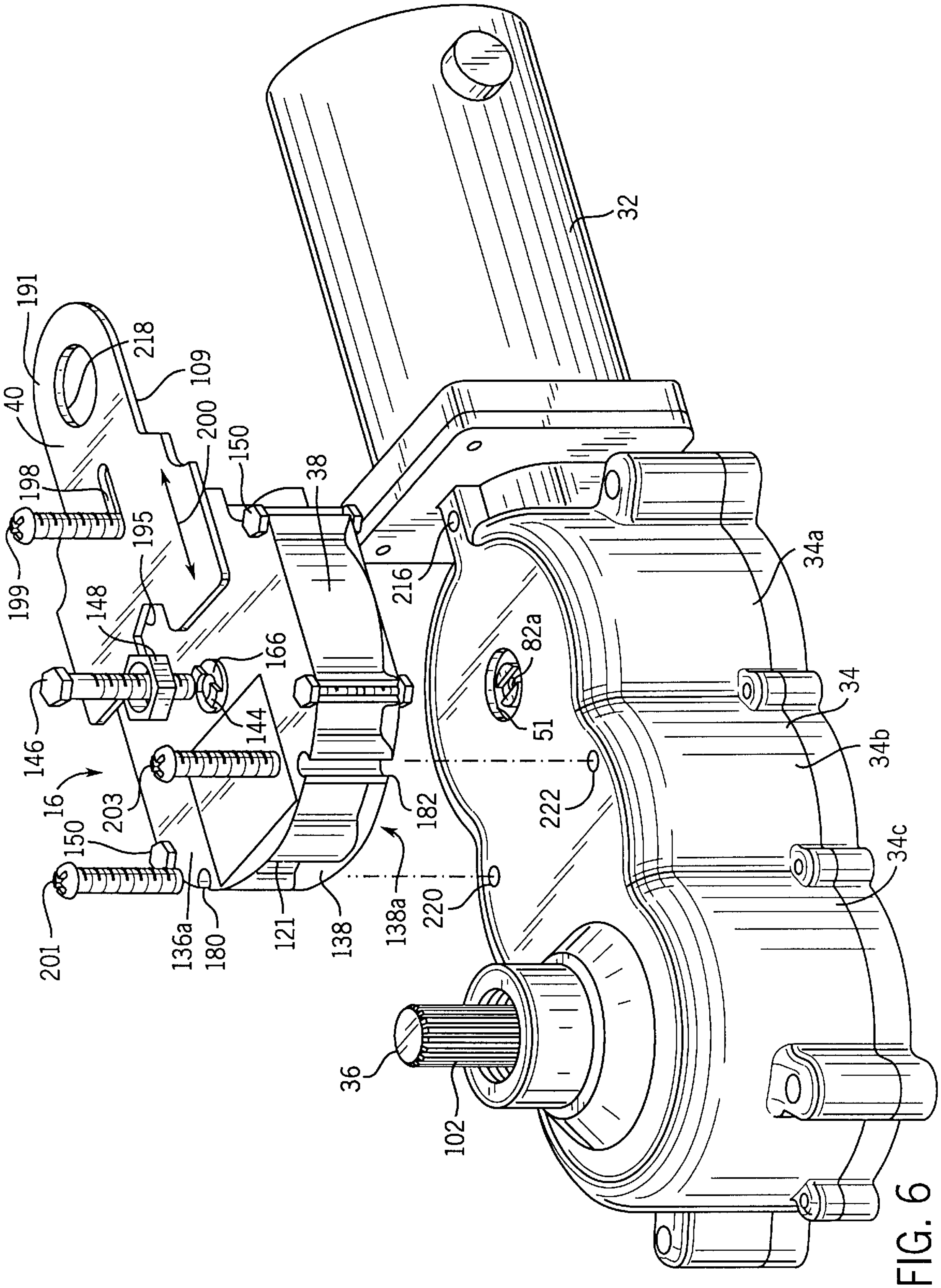
FIG. 6 is a view similar to FIG. 2, albeit in a partially exploded perspective.

In addition, referring to FIG. 6, housing 34 also forms threaded screw receiving apertures 216, 220 and 222 for securing assembly 38 to housing 34. A ball bearing 74, 75, 76, and 78 is mounted in each of openings 60, 62, 64, and 68, respectively. Another ball bearing 77 is mounted in retainer bore 66. Similarly, a needle bearing 80 is mounted in drive shaft opening 70.

Motor 32 and housing 34 are securable together such that shaft 46 extends through shaft opening 56 into first chamber 34*a*. The gear train includes first, second and third gear assemblies 50, 52 and 54, respectively, which are mounted within first, second and third chambers 34*a*, 34*b* and 34*c*, respectively.

Figure 7:
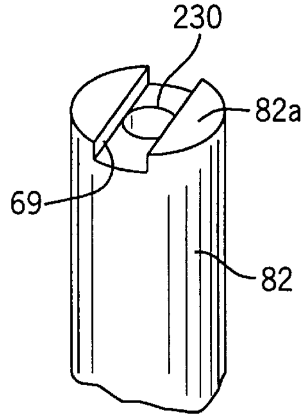
FIG. 7 is a perspective view of a shaft end of FIG. 6.

Assembly 50 includes a shaft 82 which is mounted on bearings 72 and 73 for rotation around first gear axis 84. Assembly 50 also includes a spiral bevel gear 86 and a helical gear 88 which are both securely mounted to shaft 82 for rotation therewith. Gear 86 is sized and positioned such that its toothed surface is in operative communication with gear 48. Thus, when shaft 46 is rotated by motor 32, gears 86 and 88 also rotate. Referring also to FIG. 6, a distal keyed end 82*a* of shaft 82 is exposed in aperture 51 for connection to assembly 38. To this end, referring also to FIG. 7, end 82*a* forms an axial female slot 69. In addition, shaft 82 forms a centrally located and axially extending threaded aperture 230 which passes through slot 82*a* for receiving the distal end of a bolt as will be explained in more detail below.

Assembly 52 includes a shaft 90 mounted on bearings 74 and 75 for rotation around second gear axis 85. Assembly 52 also includes a large helical gear 92 and a small helical gear 94, each of which is securely mounted to shaft 90 for rotation therewith. Gear 92 is sized and positioned such that it is in operative communication with gear 88 so that when gear 88 rotates, gear 92 likewise rotates.

Assembly 54 includes a shaft 96 mounted on bearing 76 and needle bearing 80 for rotation about third gear axis 85. In addition, assembly 54 includes a large helical gear 98 mounted securely to shaft 96 for rotation therewith. Gear 98 is sized and positioned such that it is in operative communication with gear 94 so that when gear 94 rotates, gear 98 likewise rotates. Moreover, assembly 54 also includes an extension referred to herein as drive shaft 102 which is integrally connected to shaft 96 and extends through drive shaft opening 70. A distal end 104 of shaft 102 forms teeth around its circumference.

Referring still to FIGS. 1, 2 and 3, drive arm 42 includes proximal and distal ends 106 and 108, respectively. Proximal end 106 forms an aperture 110 defined by an aperture wall which is keyed to receive the teeth of distal end 104. Thus, when arm 42 is connected to shaft 104, arm 42 rotates therewith. Distal end 108 includes a post 112 which extends perpendicular to the length of arm 42. Extension arm 44 includes proximal and distal ends 114 and 116, respectively. Each of ends 114 and 116 forms an aperture 118 and 120, respectively. Aperture 118 is formed so as to receive post 112 for pivotal movement therewith. Similarly, aperture 120 is formed so as to receive a second post 122 for pivotal movement with door 12, post 122 linking end 116 to door 12 in any manner well-known in the art.

Figure 4:
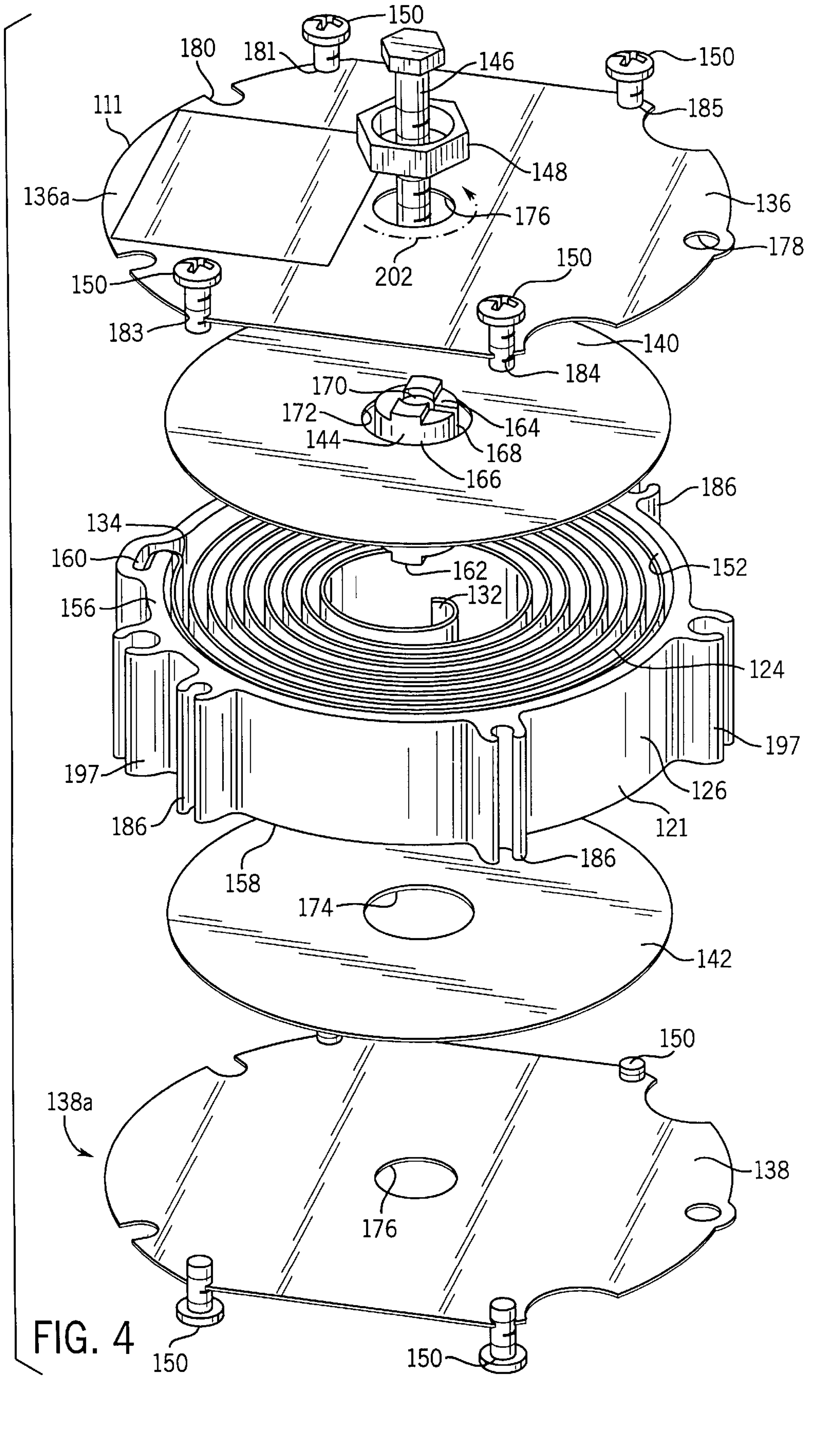
FIG. 4 is an exploded view of the spring assembly of FIG. 2.

Referring now to FIGS. 2 and 4, spring assembly 38 includes a torsional spring 124 and a spring housing. Spring 124 is made of a resilient metal (e.g. steel) ribbon having a central end 128 and a lateral end 130. Each of ends 128 and 130 forms an end hook 132, 134, respectively, for engaging other assembly components.

The spring housing includes a lateral conical member 126, a first housing cover 136, a second housing cover 138, a first thrust washer 140, a second thrust washer 142, an arbor or spring linking post 144, a center bolt 146, an adjusting bolt 148 and a plurality of self-tapping screws collectively referred to by numeral 150.

Lateral member 126 forms a cylindrical internal surface 152 which defines a spring chamber 154 therebetween and an external surface 121 which forms a plurality of screw receiving posts 186 (3 of 4 are shown) guiding posts 197 (2 of 3 are shown). Posts 197 are approximately equispaced about surface 121. Similarly, posts 186 are approximately equispaced about surface 121. Member 126 has first and second edges 156, 158 at oppositely facing ends of chamber 154. Wall 152 also forms a stopper 160 which is designed to securely receive and restrain movement of lateral spring end 130. In the embodiment illustrated, stopper 160 is a recess formed by wall 152 which receives end hook 134.

Figure 5:
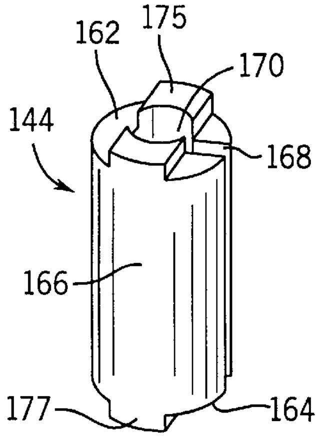
FIG. 5 is a perspective view of the linking post of FIG. 4.

Referring to FIGS. 4 and 5, linking post 144 is an elongate member having first and second ends 162, 164, respectively, and forms a lateral surface 166 between ends 162, 164. Surface 166 forms a slot 168 between ends 162 and 164 for receiving end hook 132. End 162 is keyed forming an axially extending male extension 175 which is sized and shaped to be receivable within slot 69 of end 82*a* (see also FIG. 7). Similarly, end 164 is keyed so as to form an axially extending male extension 177 which is identical to extension 175. Thus, extension 177 also can be securely mated in slot 69. In addition, post 144 forms a screw guiding channel 170 which extends from end 164 through to end 162 unimpeded.

Washers 140 and 142 are circular plastic washers, each of which forms a concentric aperture 172, 174, respectively, which is large enough for post 144 to pass through unimpeded.

Referring still to FIG. 4, housing covers 136 and 138 are identical and therefore only features of cover 136 will be explained here. Cover 136 is a sheet like rigid member designed to essentially enclose edge 156. Therefore, cover 136 is defined by an external edge 111 which extends slightly past edge 156. Cover 136 also defines two apertures 176 and 178 and edge 111 defines six recesses 180, 181, 182, 183, 184 and 185 which are spaced about edge 114.

Recesses 180 and 182 and aperture 178 are used to secure assembly 38 to gear housing 34 via three screws 199, 201 and 203 (see FIG. 2). To this end, each of recesses 180 and 182 and aperture 178 are aligned with a separate screw guiding post 197. Recesses 181, 183, 184 and 185 are used, in conjunction with screws 150 to secure cover 136 to member 126 via screw receiving posts 186. To this end, each of posts 186 is threaded on either end and is sized to threadably and securely receive one of screws 150. Aperture 176 is concentrically located in cover 136 and is sized so that post 144 can pass there through unobstructed.

Referring to FIG. 4, bolts 146 and 148 cooperate to provide two separate functions. First, bolts 146 and 148 are used to maintain one of post ends 162 or 164 in mating relationship with shaft end 82*a* (see FIGS. 5 and 7). Second, during a spring pretensioning procedure bolts 146 and 148 cooperate with locking plate 40 to temporarily maintain spring tension in a manner described in more detail below.

Referring to FIG. 4, adjusting bolt 148 is defined by a hexagonal external surface 188, a top surface 189, an oppositely facing bottom surface (not illustrated), two recessed boars 190, each of which has a radius $R_1$, a separate recessed boar 190 formed in each of the top surface 189 and the bottom surface, two recessed slots 192 (only one shown), one recessed slot formed in each of boars 190 and a centrally located aperture 194 having a radius $R_2$ which is less than radius $R_1$. Slots 192 are formed so that they are mirror images of keyed post end male extensions 175 and 177 so that either of posts ends 162 and 164 can mate with bolt 148.

Figure 11:
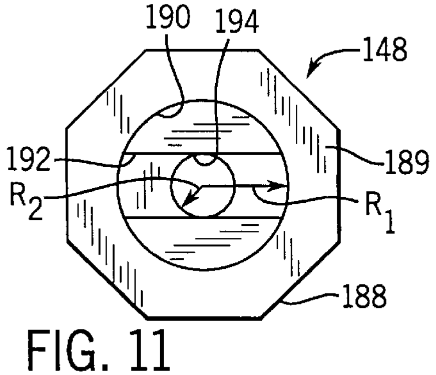
FIG. 11 is a plan view of an adjusting bolt of FIG. 1.

Referring to FIGS. 4 and 11, center bolt 146 is a conventional bolt having a length which is long enough to extend through assembly 38 and having a diameter which passes unimpeded through aperture 194 and channel 170. A distal end (not illustrated) of bolt 146 is threaded and sized to be securely receivable with aperture 230 (see FIG. 7). The head of bolt 146 must be larger than the width of slot 192.

Referring to FIG. 4, to assemble assembly 38, screws 150 are used to secure second housing cover 138 to edge 158 of member 126. Next, washer 142 is placed on an internal surface of cover 138 within chamber 154. Spring 124 is placed inside chamber 154 resting on washer 142 with end hook 134 securely received within stopper 160.

End hook 132 is secured within slot 168 of post 144 so that first end 162 extends through aperture 174 and through aperture 176 of cover 138. End 164 extends past edge 156. Washer 140 is placed on the free edge of spring 124 and should fit inside chamber 154 below edge 156 with end 164 extending through aperture 172. Cover 136 is then securely attached to member 126 via screws 150 which are received in posts 186 and so that end 164 extends through aperture 176. Referring now to FIG. 6, at this point spring assembly 38 is a self-contained unit having a lateral external surface formed by member 126, a first cover external surface 136*a* formed by cover 136 and a second cover external surface 138*a* formed by cover 138 wherein surfaces 136*a* and 138*a* are oppositely facing. Post end 164 extends past surface 136*a* while end 162 (see FIG. 4) extends past surface 138*a*.

It should be appreciated that after assembly 38 is assembled, upon an external perusal assembly 38 appears identical and has the same physical characteristics and dimension when viewed from either a plan or perspective view of either surface 136*a* or 136*b*. Importantly, each end 162 and 164 protrudes from an adjacent surface and ends 162 and 164 are identically keyed.

However, referring to FIGS. 4 and 6 it should be appreciated that assembly 38 operation depends on assembly orientation and specifically which post end 162 or 164 is linked to the gear train. For example, as assembly 38 is illustrated in FIG. 4, linking end 164 to a gear, spring 124 would tend to force the linked gear to rotate in the clockwise direction. However, if assembly 38 were flipped upside down so that end 162 faces upwardly in FIG. 4, linking a gear to end 162, spring 124 would tend to force the linked gear to rotate in the counter-clockwise direction. Thus, clearly assembly 38 orientation affects operation. However, more importantly assembly 38 can be connected to the gear train inside housing 34 in either of two different orientations to facilitate many different system operating characteristics to accommodate virtually any environmental constraints. This will become apparent in the description which follows.

Referring still to FIG. 6, locking plate 40 is a sheet-like rigid member having several important and practical features required to provide a single function. Plate 40's function is to, during a pretensioning procedure, lock post 144 in a single orientation impeding post rotation. To this end, plate 40 cooperates with bolt 148. Plate 40's importance features are as follows. First, plate 40 must include some mechanism to hold the plate 40 essentially against an external cover surface (i.e. either 136*a* or 136*b*). To this end, plate 40 defines an elongated aperture 198. When assembled, screw 199 passes loosely through aperture 198, extends through apertures 178 and is received in threaded aperture 216 formed by housing 134. Second, a plate edge 109 defines a recess 195 which preferably mirrors a lateral surface of bolt 148. Third, plate 40 includes an extended portion or member 191 which extends opposite recess 195. Member 191 forms another aperture 218 which can be used for manipulating plate 40 between a locked position wherein plate 40 engages bolt 148 and an unlocked position wherein plate 40 does not engage bolt 148. Fourth, aperture 198 is elongated and extends away from recess 195. When assembled, plate 40 is attached loosely adjacent either surface 136*a* or 136*b*. By grasping extension 191 a technician can force plate 40 between the locked and unlocked positions by forcing plate 40 in the direction indicated by arrow 200. Plate 200 is illustrated in the unlocked position with screw 199 at one end of aperture 198. By moving plate 40 in direction 200 toward bolt 148 until screw 199 is at the opposite end of aperture 199, eventually bolt 148 is received within recess 195 and bolt 148 rotation is impeded.

Referring to FIG. 4, to secure assembly 38 to housing 34 for closing a right-hand-hinged inwardly opening door, assembly 38 is assembled as illustrated with bolt 148 adjacent external surface 136*a*. Then assembly 38 is secured to housing 34 with external surface 138*a* adjacent housing 34 with external surface 138*a* adjacent housing 34 (see FIG. 6). To secure assembly 38 to housing 34 for closing a right-hand-hinged outwardly opening door, referring to FIGS. 1, 2, and 4, assembly 38 is assembled such that bolt 148 is adjacent external surface 136*a* and external surface 138*a* is adjacent housing 34. Assembly 38 is positioned such that recess 180 and 182 align with screw receiving bores 220 and 222, respectively, and such that apertures 178 (see FIG. 4) are aligned with bore 216. In this position post end 162 is aligned with shaft end 82*a*. When assembly 38 is placed adjacent chamber 34*a*, end 82*a* securely receives adjacent end 162.

Once ends 82*a* and 162 mate, screws 194, 201 and 203 are fed through recesses 180 and 182 and apertures 178 are threadably and securely received in bores 216, 220 and 222, respectively. Plate 40 is also attached via screw 199 at this time. To ensure that end 82*a* and post end 162 remain mated, bolt 148 is placed on the opposite post end 164 so that the post extension 177 is received within slot 192 and aperture 194 is aligned with aperture 170. Then bolt 146 is slid through apertures 194 and 170 and is threadably received within aperture 230 (see FIG. 7). Bolt 146 is not fully tightened but should be tightened to the point where the post extensions 175 and 177 remain mated with end 82*a* and slot 192, respectively.

In this way, bolts 146 and 148 cooperate to maintain ends 82*a* and 162 in a secure and mated relationship. It should be appreciated that when ends 82*a* and 162 are mated, post 144 rotates when shaft 82 is rotated about axis 84.

Referring again to FIG. 2 and also to FIG. 1, a stopping post 234 is securable to an external surface of housing nipple section 72 via a clamp device 236 as well known in the art. Upon assembly, post 234 is positioned so as to constrain arm 42 motion to a maximum open position (see FIG. 1).

In addition, although not described in detail here, other components may be included in system 16 for controlling door operation. For example, as well known in the industry, limit switches are often provided for determining the position of door 12 along either an opening or closing arc and door opening speed is adjusted as a function thereof. For example, proximity switches may be provided above arm 42 to sense, during a door opening movement, when the door is within the last 10% of the opening arc. During the first 90% of an opening arc, motor 32 may be driven at a maximum speed to open the door quickly. During the last 10% of the opening arc, motor speed may be slowed to minimize impact between arm 42 and post 234. Similarly, in systems where a motor is used to close instead of open a door, switches may be used to reduce motor 32 speed during the last 10% of a closing arc. Moreover, at the end of a closing arc where closing is accomplished via spring assembly 38, motor 32 may be used in a braking mode to slow door closure during the last 10 or so percent of the closing arc. While these switches and their functions are important, the switches are not important for an understanding of the present invention and therefore a more detailed explanation of their structure and operation will not be provided here.

B. Pretensioning Procedure

Referring now to FIGS. 1 and 4, for the purposes of this explanation it will be assumed that assembly 38 has been secured to housing 34 such that when door 12 is moved from a closed to an opened position in the counter-clockwise direction, post 144 rotates in the direction indicated by arrow 202. In this case, it should be appreciated that spring tension in spring 124 is increased during a door opening movement. To ensure that the force stored by spring 124 during the opening movement is of a sufficient magnitude to close door 12 after power to motor to 32 cut off, because of its design and location which enable easy access to assembly 38, spring 124 can be pretensioned prior to connecting drive arm 42 to extension arm 44.

To this end, referring still to FIG. 1, during a pretension procedure, arm 42 is connected to drive shaft 36 and is rotated in the door opening counter-clockwise direction indicated by arrow 204 to simulate a door opening procedure. Referring also to FIG. 4, during arm 42 movement, as when door 12 opens, the gears inside housing 34 rotate such that post 144 is forced in the direction indicated by arrow 202. Thus, as arm 204 is forced through a door opening motion, spring 124 tension is increased.

After arm 42 is forced once through a door opening motion, plate 40 is slid along external cover surface 136*a* until bolt 148 is received within recess 195. At this point plate 40 restrains further rotation of bolt 148 and thereby locks post 144 and spring 124 in the pretensioned position. With bolt 148 and post 144 movement impeded by plate 40, arm 42 is removed from shaft 36 and, if desired, can be reattached to shaft 36 force a second door opening motion to increase spring tension even further. To this end, arm 42 is reconnected to shaft 36, plate 40 is slid back in to its unlocked position allowing bolt 148 and post 144 to be rotated. Then, arm 42 is moved in the direction indicated by arrow 204 thereby further rotating bolt 148 and post 144 in the direction indicated by arrow 202. Once again, plate 40 is slid back into its engaging position with bolt 148 received and restrained by recess 195.

After a desired spring tension has been achieved, with plate 40 in the locked position (i.e. restraining post 144 motion), arm 42 is removed from shaft 36 and, with door 12 in a closed position, can be attached between shaft 36 and the proximal end 114 of extension arm 44. Plate 40 is then slid back to its unlocked position. If desired, screw 194 can then be tightened to restrain plate 40 motion or, in the alternative, plate 40 could be removed and screw 199 retightened. Pretensioning is complete.

C. Operation

After system 16 has been installed, the pretensioning procedure has been performed, arms 42 and 44 have been connected and an activation mechanism has been linked to a motor controller, system 16 should be ready for operation.

In operation, when a pedestrian triggers the activation mechanism, the motor controller provides power to motor 32 to rotate shaft 48 and gears inside housing 34 in the counter-clockwise direction such that drive shaft 36 and arms 42 and 44 cooperate to move door 12 from the closed to the open position. In addition, because post 144 is linked to shaft 82, as shaft 82 rotates, post 144 likewise rotates in the direction indicated by arrows 202 and spring tension is increased even further. When post 144 rotates spring 124 tension increases. Motor 32 continues to force door 12 open until arm 42 impacts stopping post 206.

After arm 42 contacts post 206, motor 32 maintains door 12 in the open position for a predetermined period. If the activation mechanism is not again activated in the predetermined period, at the end of the predetermined period, motor 32 power is cut off. At this point, spring 124 begins to distress and uncoil forcing post 144 in the direction opposite that indicated by arrow 202 (see FIG. 4). As post 144 rotates, because post 144 is linked to shaft 82, shaft 82 and the gears inside housing 34 rotate thereby forcing shaft 36 and arm 42 to move in a closing direction opposite the direction indicated by arrow 204. As arm 42 moves in the closing direction, arm 44 and door 12 follow thereby closing door 12.

As door 12 is closing, if the activation mechanism is again activated, the controller again provides power to motor 32 thereby causing motor 32, the gears inside housing 34 and arms 42 and 44 to cooperate to drive the door 12 into the open position. After door 12 closes, when the activation mechanism is again activated motor 32 again cooperates with other system components to open door 12.

D. Versatility Of The Inventive Configuration

In addition to being easy to install and maintain the inventive system is extremely versatile in that it can be used with any swinging door configuration including right-hand-hinged outwardly opening doors, right-hand-hinged inwardly opening door, left-hand-hinged outwardly opening doors and left-hand-hinged inwardly opening doors. For example, referring to FIG. 1, system 16 is installed such that it can open and close door 12 wherein door 12 is a right-hand-hinged outwardly opening door.

Figure 8:
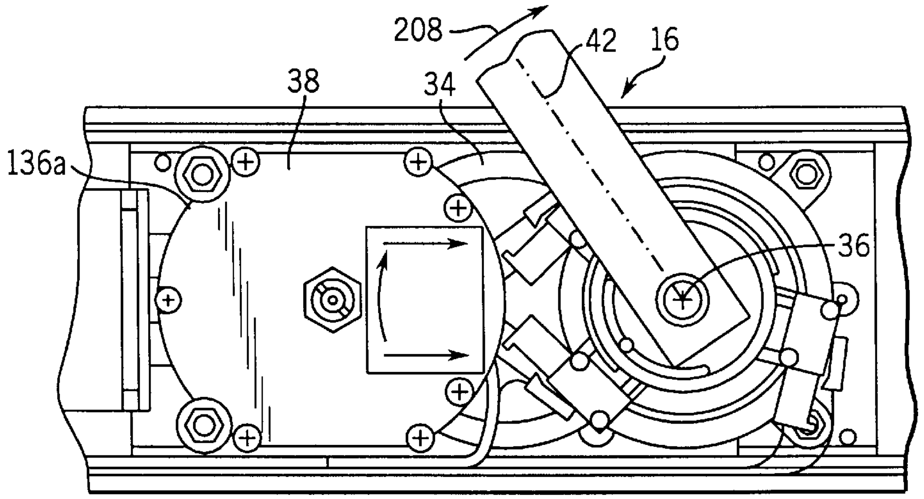
FIG. 8 is a bottom elevational view of the inventive system configured so that the spring assembly cause closure of a right-hand-hinged inwardly opening door.

Referring also to FIG. 8, a right-hand-hinged door which opens inwardly when activated is illustrated. In this case, referring to FIGS. 1 and 8, during installation of assembly 38, instead of securing assembly 38 to housing 34 with external surface 136*a* facing downwardly (i.e. external surface 138*a* adjacent housing 34), assembly 38 is secured to housing 34 with external surface 138*a* facing downwardly (i.e. surface 136*a* is adjacent housing 34). In other words, assembly 38 is secured to housing 34 in a first orientation when door 12 opens outwardly and is secured in a second orientation wherein it is flipped over with respect to the first orientation when door 12 is inwardly opening. In the case of FIG. 8, when an activation mechanism senses a pedestrian, motor 32 and other system components cooperate to force arm 42 in the direction indicated by arrow 208 (i.e. in a door opening direction). As arm 42 moves in direction 208, tension on spring 124 is increased. After motor power is cut off, spring tension forces arm 42 in the direction opposite that indicated by arrow 208 via the gears inside housing 34. Thus, it should be appreciated that by simply selecting either the first or second orientation for assembly 38, system 16 can accommodate either an inwardly or an outwardly opening right-hand-hinged door assembly.

In a similar fashion, the inventive system can also be configured so that spring 124 maintains a door open while motor 32 closes the door. For example, when an entire building loses power during an emergency, it may be desirable that all automatic door automatically open and remain open thereby allowing easy passage therethrough. Where an electric motor maintains the door closed, when power is lost the motor would no longer maintain the door closed and the assembly 38 would force the door open.

Figure 9:
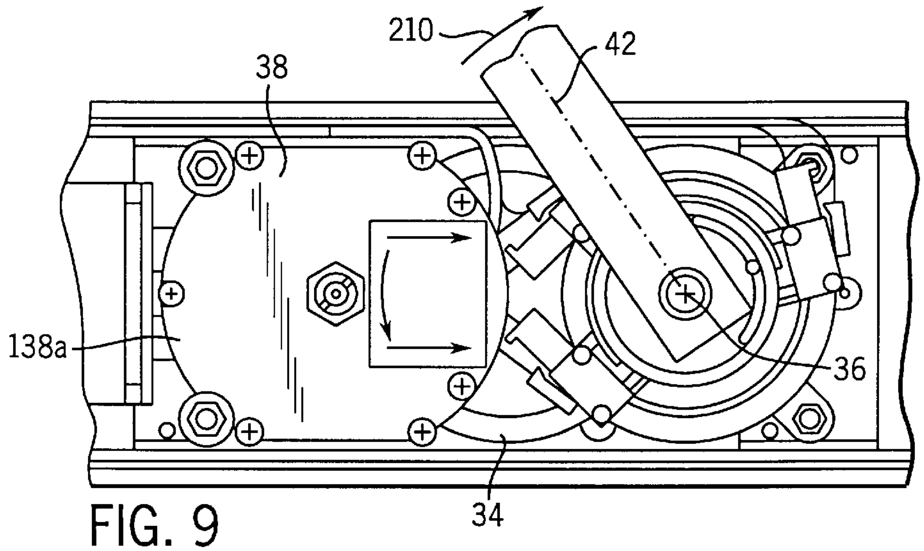
FIG. 9 is a view similar to FIG. 8, albeit configured to cause opening of a right-hand-hinged inwardly opening door.

Referring now to FIGS. 8 and 9, to configure inwardly opening right-hand-hinged door so that assembly 38 forces a door 12 open instead of closed, arm 42 is linked to door 12 such that when arm 42 is forced in the direction indicated by arrow 210, door 12 opens. In this case, instead of securing assembly 38 in the second orientation (see FIG. 8) so that spring assembly 38 forces arm 42 into a closed position, assembly 38 is flipped over and again into the first orientation so that external surface 136*a* faces downwardly and assembly 38 forces clockwise arm 42 rotation. In this case, motor 32 causes counter-clockwise arm 42 rotation. Once again, configuration of system 16 to accommodate application requirements is extremely easy.

Figure 10:
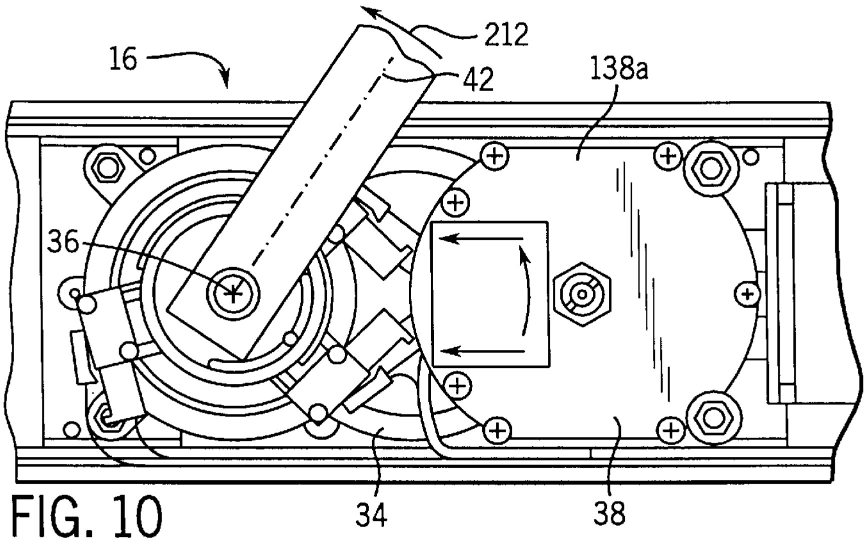
FIG. 10 is a view similar to FIG. 8, albeit configured to cause closure of a left-hand-hinged inwardly opening door.

Referring now to FIG. 10, system 16 is configured to control an inwardly opening left-hand-hinged door wherein motor 32 causes the door to open and assembly 38 causes the door to close after power is cut off from motor 32. In this case, with arm 42 linked to door 12, assembly 38 is secured to housing 34 such that external surface 136*a* faces downwardly. In this case, when power is provided to motor 32, motor 32 and other system components cooperate to force arm 42 in the direction indicated by arrow 212. As door 12 is opening, spring 124 tension increases. After motor power is cut off, spring 124 distresses and forces arm 42 and door 12 back toward the closed position in the direction opposite arrow 212.

Thus, spring assembly 38 can be configured into either one of two orientations to achieve either clockwise or counter-clockwise door moving force. Where external surface 138*a* is adjacent housing 34 so that post end 162 mates with shaft end 82*a*, assembly 38 causes clockwise arm 42 and door 12 motion. Where external surface 136*a* is adjacent housing 34 so that post end 164 mates with shaft end 82*a*, assembly 38 causes counter-clockwise arm 42 and door 12 motion.

It should be understood that the methods and apparatuses described above are only exemplary and do not limit the scope of the invention, and that various modifications could be made by those skilled in the art that would fall under the scope of the invention. For example, while the present invention is described as one for use with a motor 32 which only drives a gear train in a single direction, clearly, the invention could be, and is intended to be used, with other types of bi-directional motors which can drive the gear train in either a clockwise or counter-clockwise direction. In the case where a bi-directional motor is provided, instead of allowing assembly 32 to freely force the door from either an open to a closed position or from a closed to an open position after power is cut off to motor 32, motor 32 may be used to regulate the speed with which assembly 38 forces the door into a final position. In addition, the present invention also contemplates an assembly 38 which cannot be flipped over which is only meant to be used to drive a door in a single direction. Although this embodiment may not be as useful as the bi-directional assembly discussed above, it would still be advantageous in that a relatively small spring could be coupled to the gear adjacent motor 32 to affect door closure. Moreover, other types of locking mechanisms in addition to locking plate 40 could be used to retard post 144 motion during a pretensioning procedure. Furthermore, while the preferred embodiment is described as employing helical type gears, clearly a gear train including a piston type last gear linking the rest of the gear train to shaft 36 could be employed. Moreover, the gear train may include as few as two gears or many more gears arranged to form a longer gear train. In addition, while usually it is preferred that the spring be linked to the first gear in the train adjacent the motor, clearly, the invention is also meant to contemplate other configurations where the spring is attached to some other gear which is not the last gear. For example, where the gears include a last gear and N other gears, the spring may be arranged around an Mth gear axis and linked to the Mth gear where the Mth gear is any of the N gears.

To apprise the public of the scope of this invention, we make the following claims.

We claim:

1. A spring apparatus for use with a swinging door closure system, the system used to move the door between first and second door positions, the system including a motor having a rotor shaft, a gear housing and a plurality of gears forming a gear train positioned within the housing, the train having a last gear at a distal end and N other gears including a first gear at a proximal end opposite the distal end and in operative communication with the rotor shaft, each gear centered along a gear axis for rotation, a drive shaft extending from the last gear, an arm member linked to the drive shaft at a proximal end and to the door at a distal end, the apparatus positionable in at least a first orientation with respect to the closure system, when power is provided to the motor to drive the rotor in a first direction the gears rotate such that the drive shaft and arm force the door from the first to the second position, when the apparatus is in the first orientation, the apparatus for forcing the door from the second back into the first position when power is cut off to the motor, the apparatus comprising:

a stopper securable in a fixed position with respect to the gear housing; and a torsional spring arranged about an Mth gear axis having central and lateral spring ends, a first of the spring ends linked to the Mth gear and a second of the spring ends linked to the stopper, the Mth gear being one of the N gears;

whereby, when the apparatus is in the first orientation the spring is wound about the Mth gear axis from the first to the second ends such that the spring is compressed when power is provided to the motor to drive the rotor in the first direction and the spring expands thereby forcing the door back into the first position when power is cut off from the motor.

2. The apparatus of claim 1 wherein the Mth gear is the first gear.

3. The apparatus of claim 2 wherein the first position is an open position and the second position is a closed position.

4. The apparatus of claim 2 wherein the central end is the first spring end.

5. The apparatus of claim 4 further including a spring housing including a lateral member forming an internal wall which forms a chamber, the lateral member having first and second edges at first and second oppositely facing ends of the chamber, respectively, the internal wall also forming the stopper, the housing also including a housing cover which essentially encloses the chamber first end, the first gear including a securer and the apparatus further including a linking post having first and second ends, the first end formed so as to be securable to the securer, the post extending from the first end along the gear axis approximately through the center of the spring to the post second end, the spring contained within the chamber with the central end secured to the post and the lateral end secured to the stopper, the apparatus also including a securing mechanism for securing the spring housing to the gear housing, when the apparatus is in the first orientation, the first post end securely linked to the securer and the second edge proximate the gear housing.

6. The apparatus of claim 5 wherein the post forms a lateral surface between its first and second ends and the lateral surface forms a slot for securely receiving the spring central end.

7. The apparatus of claim 5 wherein the post first end is keyed and the securer forms an oppositely keyed recess for receiving the first end when the apparatus is in the first orientation.

8. The apparatus of claim 7 further including a tension adjuster for adjusting the tension of the spring.

9. The apparatus of claim 8 wherein the housing cover forms a cover aperture which is essentially concentric with the gear axis, the second post end extends through the aperture and, when the apparatus is in the first orientation, spring tension can be adjusted by rotating the post about the gear axis.

10. The apparatus of claim 9 further including a locking mechanism for locking the second end in an adjusted position.

11. The apparatus of claim 9 wherein the second post end is also keyed and the tension adjuster includes an adjusting bolt which forms an oppositely keyed recess which securely receives the second post end when the apparatus is in the first orientation, spring tension being adjustable by rotating the adjusting bolt.

12. The apparatus of claim 11 wherein the adjusting bolt forms a bolt lateral surface and the apparatus further includes a locking mechanism for locking the adjusting bolt into an adjusted position during pre-tensioning of the spring, the locking mechanism including a locking plate which is linked to the housing cover for movement between an unlocked position wherein the plate does not contact the bolt lateral surface and a locked position wherein the plate engages at least a portion of the bolt lateral surface and impedes rotation thereof.

13. The apparatus of claim 12 wherein the securer also forms an approximately centrally located threaded receiving channel, the post forms a post channel along its length ad the adjusting bolt forms an approximately centrally located bolt aperture and the apparatus further includes a center bolt which extends through the bolt aperture and post channel and is threadably received within the receiving channel for linking the post to the gear first gear.

14. The apparatus of claim 9 wherein the housing cover is a first housing cover, the housing aperture is a first housing aperture, the assembly further includes a second housing cover which essentially encloses the chamber second end and the second housing cover forms a second cover aperture through which the post first end extends.

15. The apparatus of claim 14 wherein the first and second post ends are identically keyed and the first and second housing covers are identical and wherein, when power is provided to the motor to drive the rotor in a second direction opposite the first direction the gears rotate such that the drive shaft and arm force the door from the second to the first position, the apparatus also positionable in a second orientation for forcing the door from the second back into the first position when power is cut off to the motor, when in the second orientation, the spring housing secured to the gear housing such that the first housing cover is adjacent the gear housing, the second keyed end is securely received by the securer and the spring is wound about the gear axis from the first to the second ends such that the spring is compressed when power is provided to the motor to drive the rotor in the second direction and the spring expands thereby forcing the door back into the second position when power is cut off from the motor.

16. The apparatus of claim 15 wherein the first post end extends through the second aperture and when the apparatus is in the second orientation, spring tension can be adjusted by rotating the post about the gear axis.

17. The apparatus of claim 16 further including a tension adjuster for adjusting spring tension, the adjuster including an adjusting bolt which forms a recess which is keyed to securely receive either of the first or second keyed post ends, the adjusting bolt receiving the second post end when the apparatus is in the first orientation and receiving the first post end when the apparatus is in the second orientation.

18. The apparatus of claim 17 wherein the adjusting bolt forms a bolt lateral surface and the apparatus further includes a locking mechanism for locking the adjusting bolt into an adjusted position during pre-tensioning of the spring, the locking mechanism including a locking plate which, when the apparatus is in the first orientation, is linked to the first housing cover for movement between an unlocked position wherein the plate does not contact the bolt lateral surface and a locked position wherein the plate engages at least a portion of the bolt lateral surface and impedes rotation thereof and, when the apparatus is in the second orientation, is linked to the second housing cover for movement between an unlocked position wherein the plate does not contact the bolt lateral surface and a locked position wherein the plate engages at least a portion of the bolt lateral surface and impedes rotation thereof.

19. A swinging door closure system for moving a door between first and second door positions, the system comprising:

a motor having a rotor shaft;

a gear assembly including a gear housing and a plurality of gears forming a gear train positioned within the housing, the housing forming a linking shaft aperture, the train having a first gear at a proximal end in operative communication with the rotor shaft and a last gear at a distal end opposite the proximal end, the first gear centered for rotation along a gear axis and including a spring linking shaft which extends out the linking shaft aperture, a drive shaft extending from the last gear;

an arm member linked to the drive shaft at a proximal end and linkable to the door at a distal end; and a spring assembly linkable to the spring linking shaft outside the gear housing;

whereby, when power is provided to the motor to drive the rotor in a first direction the gears rotate such that the drive shaft and arm force the door from the first to the second position; and whereby the spring assembly can be positioned in a first orientation with respect to the gear housing wherein the spring is wound about the gear axis from the first to the second ends such that the spring is compressed when power is provided to the motor to drive the rotor in the first direction and the spring expands thereby forcing the door back into the first position when power is cut off from the motor.

20. The system of claim 19 wherein, when power is provided to the motor to drive the rotor in a second direction opposite the first direction the gears rotate such that the drive shaft and arm force the door from the second to the first position, the spring assembly also positionable in a second orientation for forcing the door from the second back into the first position when power is cut off to the motor, when in the second orientation, the spring wound about the gear axis from the first to the second ends such that the spring is compressed when power is provided to the motor to drive the rotor in the second direction and the spring expands thereby forcing the door back into the second position when power is cut off from the motor.

21. The system of claim 20 wherein the spring assembly includes a stopper securable in a fixed position with respect to the gear housing and a torsional spring arranged about the gear axis having central and lateral spring ends, a first of the spring ends linked to the first gear and a second of the spring ends linked to the stopper.

22. The system of claim 19 wherein the spring assembly further includes a spring housing including a lateral member forming an internal wall which forms a chamber, the lateral member having first and second edges at first and second oppositely facing ends of the chamber, respectively, a second housing cover forming a first cover aperture and a first housing cover forming a second cover aperture, the internal wall also forming the stopper, the housing also including first and second housing covers which essentially encloses the cylindrical chamber first and second ends, respectively, the first gear including a securer and the apparatus further including a linking post having first and second ends, each of the first and second ends formed so as to be securable to the securer, the post extending from the first end through the first cover aperture, chamber and second cover aperture to the post second end, the spring contained within the chamber with the central end secured to the post and the lateral end secured to the stopper, the system also including a securing mechanism for securing the spring housing to the gear housing, when the apparatus is in the first orientation, the first post end securely linked to the securer and the second cover adjacent the gear housing.

23. The system of claim 22 wherein, when power is provided to the motor to drive the rotor in a second direction opposite the first direction the gears rotate such that the drive shaft and arm force the door from the second to the first position, the spring assembly also positionable in a second orientation for forcing the door from the second back into the first position when power is cut off to the motor, when in the second orientation, the spring housing secured to the gear housing such that the first housing cover is adjacent the gear housing, the second end is securely received by the securer and the spring is wound about the gear axis from the first to the second ends such that the spring is compressed when power is provided to the motor to drive the rotor in the second direction and the spring expands thereby forcing the door back into the second position when power is cut off from the motor.

24. The system of claim 23 wherein, when the spring assembly is in the second orientation, spring tension can be adjusted by rotating the post about the gear axis and, when the spring assembly is in the first orientation spring tension can also be adjusted by rotating the post about the gear axis.

25. The system of claim 24 further including a locking mechanism for, after the spring tension is adjusted during pre-tensioning, restraining rotation of the post.

26. A spring apparatus for use with a swinging door closure system, the system used to move the door between first and second door positions, the system including a motor having a rotor shaft, a gear housing and a plurality of gears forming a gear train positioned within the housing, the train having a last gear at a distal end and N other gears including a first gear at a proximal end opposite the distal end and in operative communication with the rotor shaft, each gear centered along a gear axis for rotation, a drive shaft extending from the last gear, an arm member linked to the drive shaft at a proximal end and to the door at a distal end, the apparatus positionable in at least a first orientation with respect to the closure system, when power is provided to the motor to drive the rotor in a first direction the gears rotate such that the drive shaft and arm force the door from the first to the second position, when the apparatus is in the first orientation, the apparatus for forcing the door from the second back into the first position when power is cut off to the motor, the apparatus comprising:

a stopper securable in a fixed position with respect to the gear housing; and a spring linked between an Mth gear and the stopper wherein the Mth gear is one of the N gears;

whereby, when the apparatus is in the first orientation the spring is arranged such that the spring is compressed when power is provided to the motor to drive the rotor in the first direction and the spring expands thereby forcing the door back into the first position when power is cut off from the motor.

27. The apparatus of claim 26 wherein the Mth gear is the first gear.

28. The apparatus of claim 27 wherein the spring is a torsional spring arranged about the gear axis.

* * * * *